Aug. 31, 1954     E. MENZ ET AL     2,687,532

STOCKING AND GARMENT CONNECTING MEANS THEREFOR

Filed June 3, 1952                                        2 Sheets-Sheet 1

INVENTORS.
E. Menz &
M.W. Schmidt

By Bryant & Lowry
Attys.

Aug. 31, 1954 E. MENZ ET AL 2,687,532
STOCKING AND GARMENT CONNECTING MEANS THEREFOR
Filed June 3, 1952
2 Sheets-Sheet 2
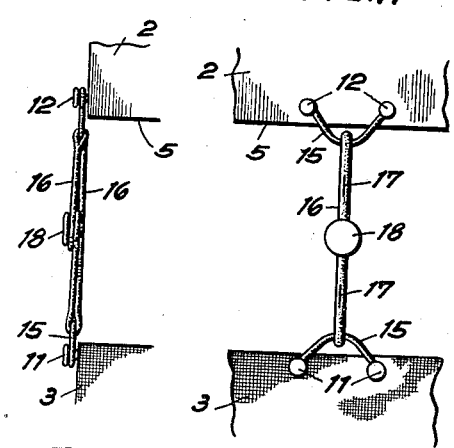
INVENTORS.
E. Menz &
M. W. Schmidt
By Bryant & Lowry
Attys.

Patented Aug. 31, 1954

2,687,532

UNITED STATES PATENT OFFICE 2,687,532

STOCKING AND GARMENT CONNECTING MEANS THEREFOR

Emil Menz and Marie Wilhelmine Schmidt, Weingarten, Germany

Application June 3, 1952, Serial No. 291,462

2 Claims. (Cl. 2—240)

The present invention refers to a connecting device between stocking and bodice, in particular such a device whereby an excellent smooth fitting of the stocking is achieved and a dislocation of the seam of the stocking is prevented.

Garters are known consisting of rubber or spiral wire and a sliding buckle or a button device for the adjustment of the length and of the fastener made of metal or plastics.

The rubber band hitherto employed is necessarily stitched so frequently that the rubber threads are clipped and that the elasticity of the band is gone.

The garters hitherto known are unavoidably provided with hard objects, the painful and injurious pressure of which on veins and nerves in the sitting position is feared very much.

A further disadvantage of the garters hitherto known is the fact that they injure the tissue of the stockings.

The novelty which is the object of the invention avoids the use of single straps and the connections are not led, as usual, from the support to the stocking, but from the stocking to the support, thereby achieving a uniform strain of the tissue of the stocking which in turn results in sparing of the tissue of the stocking, exact position of the seam of the stocking, tightness of the stocking and the possibility to move freely to all sides without any danger of pressure applied to the body.

Figure 1:
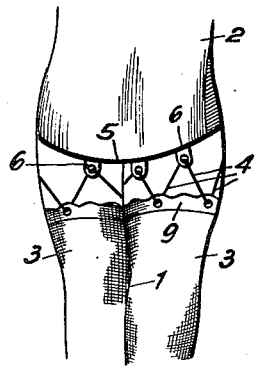
Figure 2:
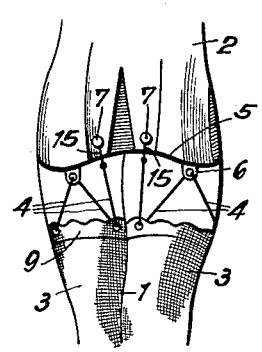
Figure 7:
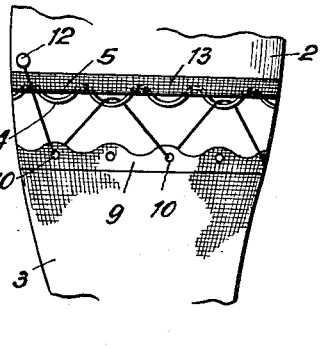
Figure 3:
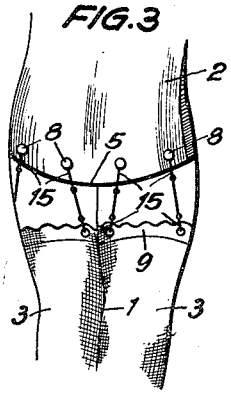
Figure 4:
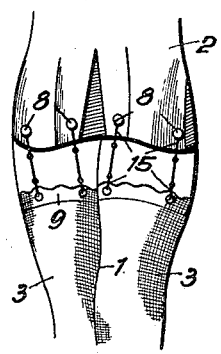
Figure 8:
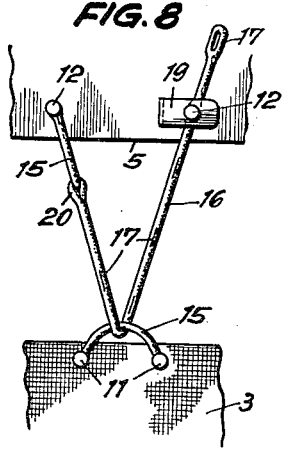
Figure 5:
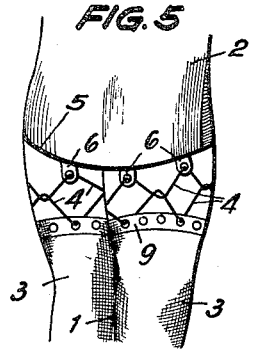
Figure 6:
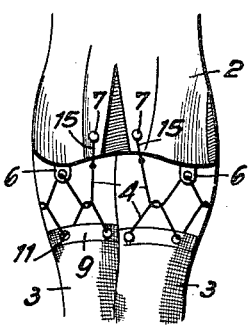

Figs. 1 and 2 are rear and front fragmentary elevations, showing one form of connecting device between the stocking and bodice, Figs. 3 and 4 are rear and front fragmentary elevations, showing another form of connecting devices, Figs. 5 and 6 are rear and front fragmentary elevations showing still another form of connecting device, Fig. 7 is a fragmentary view showing adjacent ends of a stocking and support or bodice with another form of connecting device, Fig. 8 is a fragmentary view showing in front elevation a sliding triangular connection, Fig. 9 is a side view of the sliding triangular connection according to Fig. 8, Fig. 10 is a side view of a straight sliding connection, Fig. 11 is a front view of the straight sliding connection of Fig. 10, Fig. 12 and 13 represent schematically the loop fastening system of a standard type stocking, Fig. 14 a loop connection of the described garter, Fig. 15 shows the top end of a worsted stocking with connecting parts and detachable loop, Fig. 16, 17 show different fastening points on stocking and bodice, Fig. 18 is a front view of a directly applied suspension.

Figure 19:
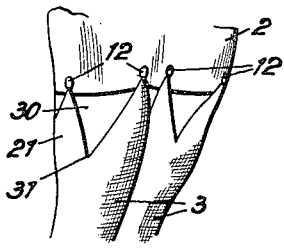

Fig. 19 shows a direct connection between the stocking and bodice.

The lower part of the support and the upper end of the stockings are shown in Figs. 1–6. I is the partition line between the thighs, 2 is the bodice or support, and 3 are the stockings.

The uninterrupted movableness of the connecting element all over the entire circumference without any metal parts avoids overstraining of the support and, in particular, of the stocking and, before all, its destruction by the one sided stress of the hitherto employed types of garters.

Apart from the circumferential connection it is possible to use a connection running almost perpendicular from the stocking towards the opposite part of the support. Along the circumference of the thigh one, two, or optionally many connections may be arranged in equal distances. (Figs. 3, 4, 17, 18).

In such cases where there is almost none or no intermediate space between the lower end of the support and the upper end of the stocking no elasticity could be obtained with the hitherto employed fastening arrangements. The new arrangement as shown in Fig. 16, however, achieves this end.

With reference to Fig. 16, the fastening points 23, 24, 25 are situated on the back side, the points 26, 27, 28, 29, however, are positioned on the front side of the body. The figure markings in Fig. 16 are chosen in accordance to the other figures. 2 is a bodice, 5 is the lower end of said bodice, 3 is a stocking, and 23—29 are fastening points located and distributed on the stocking and on the bodice. In the same way as in Figs. 1, 2, 5, 6, 7, the connection is movably arranged and it is only required to disconnect the fastening parts 29 to have all connections disconnected in a moment. 23 is the starting point fastened by means of the loop of the connection running to 29 from behind to the front.

The arrangements as shown in Figs. 1, 2, 5, 6, 7 and 16 are especially designed for ladies' supports production according to the ideas described in the present invention. The other methods of application as shown in Figs. 3 and 4 being a few examples which can be optionally supplemented are considered to be applied with standard type supports and stockings.

The points 6 at the lower end of the bodice for the sliding support of the connecting cord 4 as shown in Figs. 1, 2, 5, 6, consist preferably of small known flaps or similar gadgets out of plastics, leather, etc., being open at two sides and opening up at either top or bottom by means of a patent fastener (similar to the loops employed with braces for the sliding support or rolling support—if rollers are provided within the loops—of the straps).

The ends 7 as represented in Fig. 2 and Fig. 6 or the other fastening points marked with 8 respectively, see Fig. 3 and Fig. 4, can be made of patent fasteners as shown in example 12 of the Figs. 8 and 9, the rubber tissue 16 provided with buttonholes 17 thereby being fixed directly to the button, or, in case of single connections as represented in Figs. 3 and 4 the just mentioned rubber tissue cords are connected by means of a button 18, see Figs. 10 and 11, to form a suspension band.

In case of stockings manufactured for the new kind of connection according to the invention the necessary connecting points are worked into the upper end of the stocking in such a way that the stocking as well as the support is provided with an optional number of such connecting points and that the connecting element is carried only through some of the openings, e. g., 10 in Fig. 7 and Fig. 15 or that the connecting ends which can always stay at the stocking are connected with loops 20, as shown in Fig. 15.

Moreover, it is possible to connect the stocking itself directly to the support by means of manufactured openings, eyes or loops, particularly so, if there is very little distance between the stocking and the support.

The possible fact that the loops 20 (Fig. 15) being rigidly connected to the stocking but at the same time being immediately detachable if desired, permits the quick connection of the loops with the loops 14 provided in the lower part 13 of the support, as shown in Fig. 7.

The usual standard type stockings can easily be provided with loops 15, 20 according to the example of Fig. 12 and Fig. 13, as applied in Fig. 3.

These connecting points consist of a soft twin button 11 which is pushed into the upper part of the stocking according to the example as shown in Fig. 12 and into the loops 20 as represented in the open position in Fig. 13. When said loop is pulled together it is detachable as well as rigidly connected to the stocking and it can stay permanently connected to the stocking in the same way as the other loops attached in the same manner to the circumference of the upper end of the stocking. The connecting cord of rubber tissue 4 is connected to the upper loop 20 (Fig. 13) in the same way in order to connect from here, the stocking and the support as shown in Figs. 1, 2, 5, 6 and 7. To have the twin button 11 (clasp buckle, or the like) handy at any moment it should be connected to the upper loop 20 by means of a thread 22, as shown in Fig. 12. Instead of a twin button 11 a simple clasp or a sliding buckle for the adjustment of the length can be used if it is not employed within the sitting region and if it is provided with an eye for the pulling through of the connecting cord.

The suspension of the stocking at the fastening points 12 of the support can be effected directly, as shown in Fig. 19. The resulting spherical two-angled portions 21 can advantageously be made of elastic tissue. The corners of the open portions 30 should begin at 31, at the end of the seam of the stocking; thereby ensuring good fitting qualities of the stocking.

Obviously, the upper part of the stocking can have different shapes, e. g., it can be straight, arched or toothed. Decorative perforations at the border of the stocking also can be used as supporting holes.

The Figures 1–19 only represent examples of the invention and there is no doubt that changes and alterations are possible; e. g. also for the shape of the open portions 30 as shown in Fig. 19.

We claim:

1. A stocking having means for connection to a supporting garment, said means comprising elongated, spaced, configurated portions rising from the upper end of said stocking, each of said configurated portions having a separable fastener element attached to the upper end thereof and adapted to be secured to the supporting garment.

2. A stocking having means for connection to a supporting garment, said means comprising spaced, elastic, triangular portions extending from the upper end of said stocking, the apex of each of said portions having a separable fastener element attached thereto and adapted to be secured to the supporting garment.

References Cited in the file of this patent

UNITED STATES PATENTS

| Number | Name | Date |
|---|---|---|
| 1,305,073 | Decker | May 27, 1919 |
| 1,437,123 | Wiechmann | Nov. 28, 1922 |
| 1,480,385 | Fraser | Jan. 8, 1924 |
| 1,874,089 | Donaldson | Aug. 30, 1932 |
| 1,897,090 | Walding | Feb. 14, 1933 |
| 2,118,102 | O'Connor | May 24, 1938 |
| 2,368,714 | Lang | Feb. 6, 1945 |
| 2,476,122 | Temple | July 12, 1949 |
| 2,493,545 | Muyleart | Jan. 3, 1950 |

FOREIGN PATENTS

| Number | Country | Date |
|---|---|---|
| 21,772 | Great Britain | Oct. 30, 1914 |